United States Patent [19]

Horn

[11] Patent Number: 4,464,419

[45] Date of Patent: Aug. 7, 1984

[54] PROCESS FOR A LOW BACK-ACTION, QUASI-HERMETIC COVERING OF SUSCEPTIBLE PHYSICAL STRUCTURES

[75] Inventor: Klaus Horn, Brunswick, Fed. Rep. of Germany

[73] Assignee: Industrie Automation Wäge- und Prozesstechnik GmbH & Co., Heidelberg, Fed. Rep. of Germany

[21] Appl. No.: 418,245

[22] Filed: Sep. 14, 1982

[30] Foreign Application Priority Data

Apr. 6, 1982 [DE] Fed. Rep. of Germany ....... 3212738

[51] Int. Cl.$^3$ ......................... H05D 5/12; H05K 5/00
[52] U.S. Cl. ..................................... 427/58; 427/343; 174/52 PE; 174/52 S; 33/DIG. 13
[58] Field of Search ............ 427/58, 343; 174/52 PE, 174/52 S; 156/603; 29/610.56, 613; 33/DIG. 13

[56] References Cited

U.S. PATENT DOCUMENTS

| | | | |
|---|---|---|---|
| 3,411,122 | 11/1968 | Schiller et al. | 29/613 |
| 4,010,440 | 3/1977 | Wellard | 29/613 |
| 4,307,371 | 12/1981 | Ort | 29/610.56 |
| 4,399,190 | 8/1983 | Iwabochi et al. | 428/454 |

OTHER PUBLICATIONS

The Condensed Chemical Dictionary, Hawley, Eighth edition, Van Nostrand Reinhold Company.

*Primary Examiner*—John E. Kittle
*Assistant Examiner*—James J. Seidleck
*Attorney, Agent, or Firm*—Wells & Wells

[57] ABSTRACT

A method for quasi-hermetically covering physical structures on structure supports is described, which is low in its back-action on the structures to be protected and is especially suited for covering strain guage strips on cantilever beam measuring springs. In the method films made of a vacuum-tight, inorganic material are used as the covering substance, these films intimately joining both the structure to be protected and the surface zone of the support in the immediate vicinity of the structure. The use of films of monocrystalline structure, for instance mica films, is especially recommended, and it also is recommended to decrease the thickness of these films, once they are deposited, by suitable procedures such as etching or cleaving off crystal layers.

19 Claims, 6 Drawing Figures

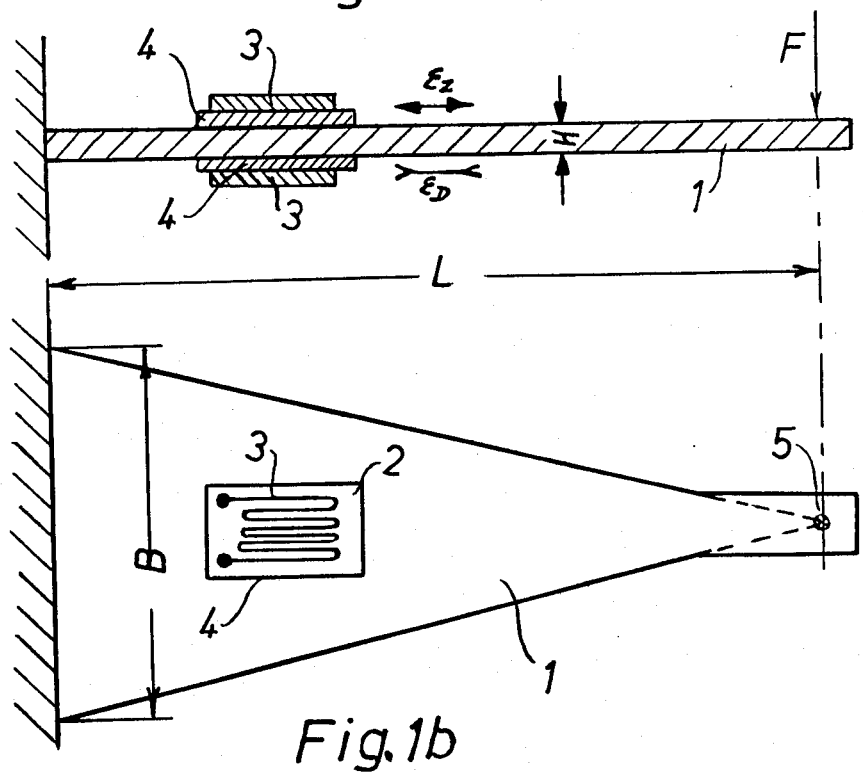
*Fig. 1a*
*Fig. 1b*
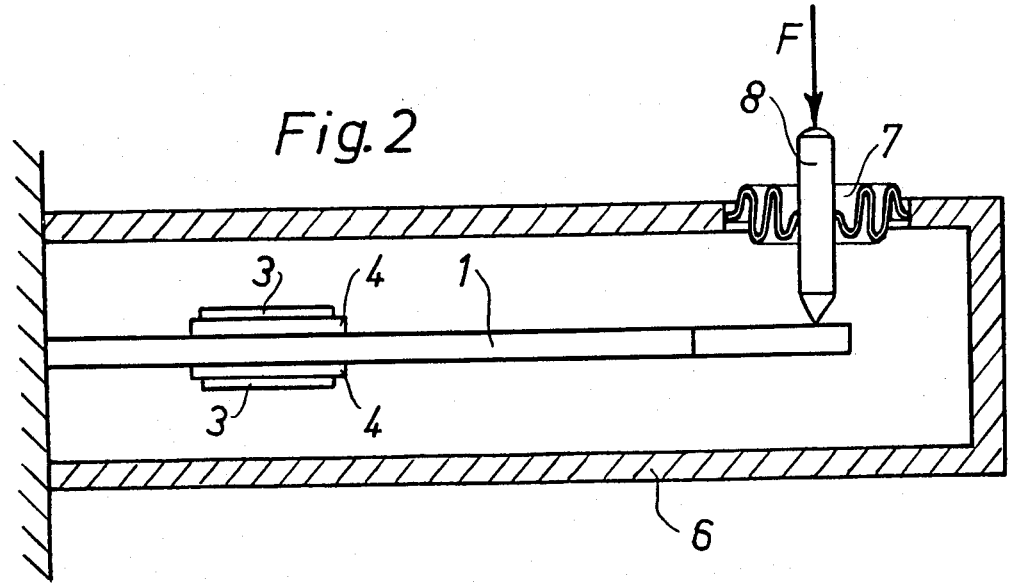
*Fig. 2*

PROCESS FOR A LOW BACK-ACTION, QUASI-HERMETIC COVERING OF SUSCEPTIBLE PHYSICAL STRUCTURES

CROSS-REFERENCE TO A RELATED APPLICATION

Applicant claims priority under 35 USC 119 for application P 32 12 738.3, filed Apr. 6, 1982, in the Patent Office of West Germany.

BACKGROUND OF THE INVENTION

The invention relates to a process for covering, in a quasi-hermetic manner that is low in reactive effects, susceptible physical structures on structure-backing surfaces to protect against soiling, chemical actions and/or physical degradations.

In practice, a problem is incurred with respect to many high-precision, microelectronic, physical, medicinal, chemical components and elements, namely how to screen functional structures deposited on the surface so they are protected to a very high degree against the actions from corrosive, aggressive and structure-deforming chemical components of the environment or against the penetration of, or exchange with, gaseous or vaporous and also liquid atmospheric ingredients.

Many methods are presently known to achieve approximately "hermetic" seals for solving many of such problems. Representatively, though not exclusively, the following are listed below:

(a) metallic covers which are metallically welded or soldered to a metal structure-backing, though they also may be bonded in special cases by organic, and, better yet, inorganic cements, (b) glass and ceramic covers which are fused or bonded with the structure backing, (c) galvanic coatings, (d) oxide coatings, (e) metal oxide or ceramic coatings deposited in vacuum for instance by sputtering or evaporation methods, and (f) epitaxial layers.

Provided sharp restrictions on sealing quality are accepted, it is also possible to use coverings of organic enamels, foils, paints or molded parts.

However, even if these do evince high chemical resistance and excellent liquid-repelling, in particular hydrophobic, properties they can seal the structures only incompletely over the long term against gases and vapors of low molecular weight because these organic covering substances ordinarily comprise cross-linked macromolecular structures which amount to molecular filters for the mentioned gases.

Typical examples are the casings for integrated semiconductor circuits and components:

The widely used plastic casings in spite of their relatively thick-walled coverings offer only restricted protection against water vapor and other structurally degrading gases; long-term stability (mil-designs) are ensured only by metal cases and those made of ceramics ($Al_2O_3$, etc.).

The selection among technically suitable solutions is much restricted when there is a need for the covering providing both the most hermetic possible seal, and that it affect the functional properties of the structure support, and/or of the structure itself as little as possible.

Thus, it may be necessary to minimally modify the heat capacity, the heat transfer, the mass of the geometric size of the structure support and/or of the structure itself by the deposition of the covering, or there may be a requirement of unimpeded access of radioactive, electromagnetic (light) or acoustic irradiation to the structure.

The term "structures" as employed herein relates preferably to such sensor elements and electrical networks as photodiodes, resistors with positive or negative temperature coefficients, gaussian elements, coils, capacitor coatings, resistance networks made from foils, wires and thin films and consisting of metal or semiconducting materials, though there are many others, which must meet high requirements in long-term stability and reproducibility.

An important illustrative application is provided by precision pick-ups for forces, pressures, and torques, among others, which by means of strain-sensing devices, for instance strain gauges, SAW generators, or capacitive pick-ups convert the surface expansions of particular surface zones of measuring springs as structure supports into electrically useful signals as a function of the mechanical values cited above that are to be measured and which are experienced by the measuring springs.

It is the object of the present invention to provide a process to cover such strain gauge strips, and further also all otherwise similar structures deposited on the surface on which they are operative, in a highly effective manner without thereby affecting the operation thereof.

The drawings illustrate an embodiment of strain gauge strips, wherein

FIG. 1a is a schematic cross-section of a strain gauge strip, left uncovered, on a cantilever spring, FIG. 1b is a top view of the spring of FIG. 1, FIG. 2 is the strain gauge strip of FIG. 1 within a covering casing, FIG. 3 shows a metal-foil covered strain gauge strip with a separating insulating layer, FIG. 4 is a view in cross-section of a strain gauge strip covered in accordance with the process of the invention, and FIG. 5 is a top view of the strain gauge strip of FIG. 4.

FIG. 1a shows a precision pick-up with cantilever measuring spring 1 of a fixed material height H and with a substantially isosceles triangular base area of length L and base-width B. This pick-up is rigidly clamped at its base and is loaded at its loading point 5, which is a distance L from the base, by a force F to be measured.

If the cantilever is made of an isotropic, highly elastic, and extremely low friction spring material with a Young's modulus E, the theory of the strength of materials shows that the force F exerts, within the triangular cantilever area, a tensile strain $\epsilon_Z$ at the upper surface and a compressive strain $\epsilon_D$ of the same magnitude at the lower side, given by the formula $$|\epsilon_{Z,D}| = \frac{6 \cdot L}{E \cdot B \cdot H^2} \cdot F \qquad \text{(I)}$$

These strains can be converted in known manner using strain gauge strips 2 into relative changes $\Delta R/R$ of their base value R, $$\Delta R/R = k \cdot \epsilon_{Z,D} \qquad \text{(II)}$$

where the proportionality factor k assumes values of about 2 to 3 for strain-gauges with metallic resistance values, whereas for semiconducting resistance values, k may assume magnitudes between ±50 and ±200.

Due to reasons of strength and material strains $\epsilon_{max}$ cannot be nominally higher at the maximum load due to $F_{max}$ than $$10^{-3} \leq |\epsilon_{Z,D,max}| \leq 2 \cdot 10^{-3} \qquad (III)$$

the maximally useable changes in resistance obtained on account of the metal resistance network strain gauges—which are distinguished by exceptional linearities—are merely, as given in Formulae (II) and (III)

$$2 \cdot 10^{-3} \leq \left| \frac{\Delta R}{R} \max \right| \leq 6 \cdot 10^{-3}. \qquad (IV)$$

If in the course of high-accuracy measurements it is desired to determine such small changes in resistance with errors $|f_{rel}| \leq 10^{-4}$ v.E., then it is necessary to keep spurious changes in resistance $$\Delta R_{fmax}/R$$

in the strain gauges subject to external spurious effects reliably less—in view of (IV)—than $$\left| \frac{\Delta R_{fmax}}{R} \right| \leq (2-6) \cdot 10^{-7} \qquad (V)$$

As, on the other hand, higher strain gauge resistances R typically in the 300 to 1,000 ohm range are used for the sake of the largest possible initial potentials of the strain gauges hooked up into Wheatstone bridge arrangements and further for the sake of low supply powers, the strain gauge resistance paths must be adequately insulated so as to obtain for the insulation resistances $R_{ins}$ which are so-to-speak in parallel with the resistance path values $$R_{ins} \geq (1.5-60) \cdot 10^9 \text{ ohms} \qquad (VI)$$

This will be possible over the long term only if humidity is reliably prevented from penetrating the insulation spacers 4 for the resistance segments 3 of the strain gauge of FIG. 1 and the insulating areas between their resistance paths, as otherwise there would be plural electrolytic insulation defects and partly also spurious galvanic potentials.

Several methods are known in the pertinent art to prevent these very effects and to screen the strain gauges against the entry of humidity:

(1) Enclosing the entire measuring spring in a vacuum-tight metal casing as shown in FIG. 2.

This approach always raises the problem of the force to be measured F having to act externally through a flexible but also vacuum-tight junction element 7, 8 on the measuring spring.

Such connecting elements have been used frequently in the form of metallic bellows or Well membranes, and also O-ring seals for very high forces to be measured.

Besides being very costly, these methods also incur the drawback that the connecting elements represent by-passes of the force to be measured, are frictional, and, due to their effective areas, will generate spurious additional forces in the case of pressure differences between the casing inside pressure and the atmospheric pressure (fluctuations in temperature and atmospheric pressure).

These spurious effects will be the more significant the lesser the peak force $F_{max}$ for which the force pick-up is designed. Presently such spurious effects cannot yet be controlled for instance as regards peak forces $F_{max} \leq 10N$ within the scope of error limits $f_{rel} \leq 2 \cdot 10^{-4}$.

(2) Covering the strain gauges and their neighboring surface zones of the measuring spring with water-repellant coatings for instance of wax, bitumen, rubber, silicone rubber and the like. The pertinent strain gauge industry offers a wide spectrum of organic coatings.

These coatings do in fact protect the strain gauges against moisture, dust, mechanical damage and a number of chemically aggressive atmospheric ingredients, and, furthermore, on account of their very low Young's modulus and hence negligible force by-pass means, they affect the measuring properties of the measuring spring only insignificantly.

However, because they are organic, macromolecular compounds, they are also molecular filters for water vapor and fail to provide effective long-term protection against humidity penetration.

As shown by lengthy, very intensive and comprehensive research, for instance at the Physical-Technical Federal Facility (PTB) at Braunschweig, West Germany, none of these coatings presently permits lowering the long-term drift to below $4 \cdot 10^{-4}$.

(3) Covering by thin metal foils. Substantially better sealing results than for method (2) when the strain gauges of FIG. 3 following their additional covering of the resistance grid by an insulating layer 9 is covered with an extremely thin metal foil 10 which then is bonded as much as possible by means of the support foils 4 of the strain gauge 2 to the surface of the measuring spring, using a minimally thin layer.

Provided that the bonding gap 15 between the metal foil and the surface of the measuring spring be kept extremely thin and long, this method offers highly effective protection against humidity which, in the light of the research of PTB, evinces significant improvements in long-term stability with respect to the method described in (2).

Especially as regards measuring springs with low peak forces $F_{max}$, the metal covering represents a significant force by-pass because in the present state of the rolling art, metals with good spring properties can be rolled down only to minimum thicknesses of about 6 microns if the metal foils will be reliably without holes and vacuum-tight.

On the other hand, the additional insulating layer 9 increases the spacing between the covering foil and the measuring surface, while at the same time, its connection however is degraded because this connection takes place through several layers of different insulating materials of poor mechanical elastic behavior.

Accordingly, measuring springs which are covered in this manner practically always evince relatively large creep and hysteresis errors that substantially affect the measurement accuracy of the force pick-ups.

(4) Inorganic coverings for thin-film strain gauges. If in lieu of the conventional strain gauges with resistance grids in foil or wire form on plastic backings 4, use is made of so-called thin-film resistance grids 3 which are vacuum-deposited by various means (sputtering, evaporation, etc.) in thicknesses from several nanometers to about 1 micron on top of inorganic insulation layers 4 which also were vacuum deposited, the grids 3 being in extremely tight contact with the measuring surface, it is possible to finally vacuum-coat such strain gauge structures with extremely thin inorganic (oxide, ceramic) covering layers which offer full protection (see K. Bethe & D. Schoen, Messaufnehmer mit Deunnfilm-DMS, Philips Techn. Rdsch. 39, 1980/1, #4, pp. 117–125).

Such methods have made it possible already for a long time in practice to produce force pick-ups, in particular for low peak forces, but also for pressure, torque and acceleration. In spite of the use of high-grade spring materials, a limit to the achievable accuracy has been set in these pick-ups by a pronounced creep of the material.

These methods further have a substantial drawback in being restricted in application to measuring springs of relatively small sizes when they are being manufactured in an economically justifiable manner in vacuum ovens. The same reason also much restricts the latitude in shaping these pick-ups.

SUMMARY OF THE INVENTION

The present invention makes it possible to avoid the drawbacks which are listed above in the strain gauge force pick-ups and relating to the known methods for manufacturing quasi-hermetic coatings in that the structures to be protected and the vicinity thereof are coated with extremely thin and as monocrystalline as possible inorganic foils in lieu of the relatively thick metal foils or even the organic deposited coating means acting as molecular filters, and where the inorganic foils of the invention evince excellent insulating properties.

Thin layers of the most finely drawn glass may be used. Such a material even for wall thicknesses in the range of about 1 micron is still capable of hermetically sealing and for those dimensions already possesses adequate mechanical flexibility to thoroughly fit itself to the structures to be covered, including irregularities or curvatures. However, the manufacture of such low wall thicknesses is costly. Monocrystalline mica provides by far the best means to implement the novel coating procedure of the invention.

Using known methods, it is possible to cleave mica along its crystal planes in a relatively simple manner down to layer thicknesses less than 1 micron; mica is clear, transparent and resistant to most of the chemically aggressive media in the atmosphere. Due to its crystalline structure it is absolutely vacuum-tight even in layer thicknesses of a few nanometers and accordingly meets all the requirements of hermetic coverings. This material offers another advantage because of its excellent elastic and spring properties in the direction of the lamination whereby extremely small radii of curvature and flexure are possible and hence the lamination can adapt to structural irregularities.

DESCRIPTION OF THE PREFERRED EMBODIMENTS

Figure 4:
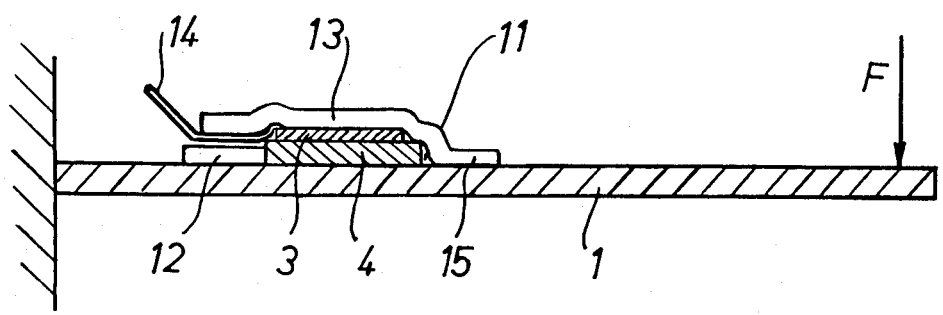
Figure 5:
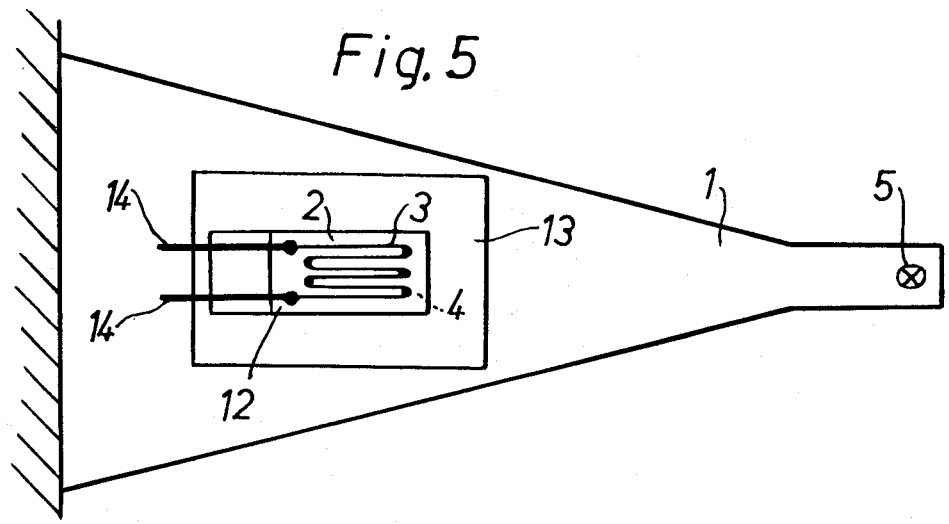

FIG. 4 is an embodiment of a cantilever force pick-up illustrating the advantages of the new covering process.

A strain gauge 2 of conventional design (wire, foil, semiconductor) and which is the structure to be protected is deposited by known methods on the surface of the pick-up measuring spring.

Figure 3:
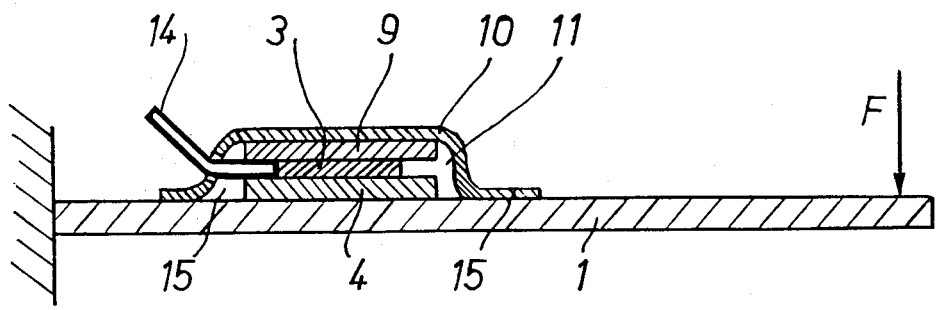

This strain gauge in accordance with a further innovation of the present invention can be advantageously manufactured so that its surface is free of any otherwise conventional electrically insulating, mechanically protecting covering 9 (FIG. 3), and in a further innovation of the invention, it may include, if need be, a thin mica film as the insulating backing 4.

The latter feature favorably affects the reduction of the strain gauge creep with film thicknesses less than 1 micron being usable, and on the other hand a marked increase in insulation resistance and most of all in the electrical breakdown voltage being the result; this is of especially great significance in the manufacture of intrinsically safe and/or explosion-safe pick-ups.

In any event, it will be advantageous to use a mica backing film 12 for the electrode leads, where this film in a further innovation of the invention also can be used where a plastic backing 4 is employed for the strain gauge.

The strain gauge grid (structure) thus joined to the surface of the measuring spring (surface of the structure support) then is covered as a unit as far as possible beyond the limits of the strain gauge (the structure) by an extremely thin mica film 13 directly sealing the adjoining surface of the measuring spring.

To that end, the structure and the adjoining surface zones are provided with a well-flowing cement and thereupon the coating film is deposited by means of an elastic interleaf and a highly compressive stamp on the surface to be coated.

In this manner the covering film, on account of its high flexibility, will hug extremely closely all the irregularities, offsets and transitions of the structure and the surface of the measuring spring and thus it makes possible only vanishingly narrow but long-stretching sealing gaps 15 between the surface of the measuring spring and the coating film, which affords excellent sealing.

Because of the transparency of the mica coating, it is easy to visually check whether the cement fills in a bubble-free manner all the residual gaps 11 between the structure and the coating film. This is advantageous because the absence of bubbles permits handling the pick-up also in a vacuum, or at decreased ambient pressure (air freight, etc.) without danger of damage to the thin covering.

The extremely thin and long-stretching sealing gap 15 makes it possible as a rule to use organic cements (for instance self-hardening multicomponent adhesives) to fix the covering in place without damage.

However, in accordance with the invention, where higher requirements are placed on sealing, inorganic, vacuum-tight cements should be used, such as are known for instance in the vacuum technique. Where necessary, the surface of the measuring spring should be passivated (for instance oxidized) near the covering zones.

In a further feature of the invention, the thickness of the covering deposited in the above described manner can be further decreased by suitable procedures, i.e., further crystal layers are removed, so that in the final state the film thickness of the coating amounts only to a few nanometers.

In this manner, the advantages of the procedure described above in relation to (4) and its minute back-action on the initial physical properties of the uncovered assembly are obtained to the fullest extent, without however, incurring the design restrictions and complex as well as costly manufacturing methods of this procedure (4).

Most of all, the method of the invention offers a significant advantage with respect to measurements over the procedure of (4)—which latter incurs only material creep—that the creeps of the strain gauge and the material of the measuring spring, which differ in their signs, compensate each other, whereby a substantial increase in measurement accuracy becomes possible.

It will be obvious to those skilled in the art that many modifications may be made within the scope of the present invention without departing from the spirit thereof, and the invention includes all such modifications.

What I claim is:

1. A method for quasi-hermetically covering a sensitive physical structure on structure support surfaces with low back-action on said sensitive structure to protect the same against soiling, chemical attack and/or physical interferences, in particular against the effect of humidity and structure-deforming gases, which comprises covering said structure with an extremely thin film of one micron or less of a vacuum-tight, inorganic material as the covering material which film is made to intimately combine both with the structure to be protected and with the support in large-area surface zones in the immediate vicinity of the structure.

2. A method according to claim 1 in which the film has a monocrystalline structure.

3. A method according to claim 1 in which the film is an extremely thin, cleaved, monocrystalline mica film.

4. A method according to claim 1 in which the film is an extremely thin, drawn glass film.

5. A method according to claim 4 in which the glass film is further decreased in thickness by etching.

6. A method according to claim 1 including using inorganic materials as cements between the film and the structure or between the structure and the support material.

7. A method according to claim 1 including using self-hardening adhesives with high electrical insulation as cements between the film and the structure or the structure and the support material.

8. A method according to claim 7 including using a multicomponent adhesive as the cement.

9. A method according to claim 1 for covering structures in the form of strain gauge strips with resistance grids made of wire, metal foil or semiconductors, including using a mica film as the support film (4).

10. A method according to claim 9 including depositing the covering film (13) directly on a resistance grid (3) without using spacer foils.

11. A method according to claim 1 including using high compression in the deposition of the covering film to produce an especially tight, intimate hugging of the covering foil to the coarse outline of the structure and of the structure support.

12. A method according to claim 1 including insulating electrode leads (14) with respect to the structure support (4) by separate mica film support elements (12) to achieve long sealing paths.

13. A method according to claim 1 including further reducing the film in thickness following fixation of the covering film on the structure to be protected.

14. A method according to claim 13 when using mica as the covering film, including reducing the thickness by cleaving off further crystal layers, whereby the residual thicknesses of the covering film are effectively only a few nanometers.

15. A method according to claim 1, wherein said thin film is mica and said sensitive physical structure is a strain gauge strip.

16. A method according to claim 15, wherein said sensitive physical structure is selected from the group consisting of photodiodes, resistors with positive temperature coefficients resistors with negative temperature coefficients, gaussian elements, coils, capacitor coatings, resistance networks made from foils, resistance networks made from wires, and resistance networks made from thin films.

17. A method according to claim 16, wherein said sensitive physical structure is a resistance network made from foils.

18. A method according to claim 16, wherein said sensitive physical structure is a resistance network made from wires.

19. A method according to claim 16, wherein said sensitive physical structure is a resistance network made from thin films.

* * * * *